United States Patent [19]

Corrigan et al.

[11] Patent Number: 5,096,556
[45] Date of Patent: Mar. 17, 1992

[54] CATIONIC MICROGELS AND THEIR USE IN ELECTRODEPOSITION

[75] Inventors: Victor G. Corrigan, North Olmsted, Ohio; Steven R. Zawacky, Pittsburgh, Pa.

[73] Assignee: PPG Industries, Inc., Pittsburgh, Pa.

[21] Appl. No.: 543,501

[22] Filed: Jun. 25, 1990

[51] Int. Cl.$^5$ ............................................. C25D 13/06
[52] U.S. Cl. ................... 204/181.7; 523/403
[58] Field of Search ................ 204/181.7; 523/403

[56] References Cited

U.S. PATENT DOCUMENTS

| | | | |
|---|---|---|---|
| 3,761,371 | 9/1973 | Dickie et al. | 204/181 |
| 4,136,070 | 1/1979 | Hazan | 260/23 AR |
| 4,433,078 | 2/1984 | Kersten | 523/404 |
| 4,560,714 | 12/1985 | Gajria | 523/409 |
| 4,785,068 | 11/1988 | Tominaga et al. | 528/45 |
| 4,788,246 | 11/1988 | Tsuchiya et al. | 524/554 |
| 4,869,796 | 9/1989 | Kanda et al. | 204/181.6 |

FOREIGN PATENT DOCUMENTS 274389 7/1988 European Pat. Off.
282000 9/1988 European Pat. Off.
63-048367 3/1988 Japan.

OTHER PUBLICATIONS

Lin, K. F., "Formation of Secondary Microgels in Epoxy Network", *Polymeric Materials: Science and Engineering*, (1989), vol. 61, pp. 830–834.

*Primary Examiner*—John Niebling
*Assistant Examiner*—Arun S. Phasge
*Attorney, Agent, or Firm*—Gary J. Connell; William J. Uhl

[57] ABSTRACT

A cationic microgel dispersion and the use of the dispersion in the method of cationic electrodeposition is disclosed. The dispersion is prepared by a process comprising dispersing in aqueous medium a mixture of a cationic polyepoxide-amine reaction product and a polyepoxide crosslinking agent and heating the mixture to a temperature sufficient to crosslink the mixture to form said cationic microgel dispersion. The dispersion can be formulated with ungelled cationic resins to form an aqueous resin dispersion which is suitable for use in the process of cationic electrodeposition providing for improved edge coverage and crater control.

23 Claims, No Drawings

CATIONIC MICROGELS AND THEIR USE IN ELECTRODEPOSITION

BACKGROUND OF THE INVENTION

1. Field of the Invention

The present invention relates to cationic microgels and to their use in cationic electrodeposition.

2. Brief Description of the Prior Art

Electrodeposition as a coating application method involves the deposition of a film-forming composition under the influence of an applied electrical potential. Electrodeposition has become increasingly important in the coatings industry because by comparison with non-electrophoretic coating means, electrodeposition offers higher paint utilization, outstanding corrosion protection and low environmental contamination. Initially, electrodeposition was conducted with the workpiece being coated serving as the anode. This was familiarly referred to as anionic electrodeposition. However, cationic electrodeposition has mainly replaced the older anionic electrodeposition and by today is the far most prevalent method of electrodeposition. Throughout the world, more than 80 percent of all motor vehicles produced are given a primer coating by cationic electrodeposition. Other areas of application are primer coatings or one-coat topcoatings of automobile accessories, farm machinery, house and electrical appliances, steel furniture and structural components.

A serious problem associated with electrodeposition as practiced industrially is in coverage over edges of the substrate being coated. The coating is relatively thin in these edge areas which results in the tendency for early and severe corrosion at the edge. The edge coverage can be improved if the inorganic pigment level of the bath is increased but this results in unacceptable roughness of the resultant coating.

SUMMARY OF THE INVENTION

In accordance with the present invention, a cationic microgel is provided. The microgel is prepared by a process comprising mixing a cationic polyepoxide-amine reaction product and a polyepoxide crosslinking agent and heating the mixture to a temperature sufficient to crosslink the mixture and form a cationic microgel. Preferably, the cationic polyepoxide-amine reaction product and polyepoxide crosslinking agent are dispersed in a reaction medium such as water and heated to crosslink the mixture and form a cationic microgel dispersion. The dispersions can be combined with ungelled cationic resins which are electrodepositable on the cathode to form an aqueous resinous dispersion suitable for use in electrodeposition. The method of electrodeposition using such aqueous dispersions is also provided.

The cationic microgels can be recovered from the aqueous dispersions as dried products such as by evaporation, spray drying or the like and the dried product used as such.

The cationic aqueous microgels when used in the process of cationic electrodeposition result in the attainment of good edge coverage and crater control while maintaining smooth films.

DETAILED DESCRIPTION

In accordance with the present invention, a cationic microgel dispersion can be prepared by first dispersing in aqueous medium a reactive mixture of the cationic polyepoxide-amine reaction product and the polyepoxide crosslinking agent. The dispersion step can be accomplished by adding the polyepoxide-amine reaction product, preferably at elevated temperatures of from 100° to 150° C. to a mixture of water and acid to form a cationic dispersion of the resin in water. Typically, the solids content of the resulting dispersion will be about 20 to 50 percent by weight and the degree of neutralization will be from 20 to 100 percent of the total theoretical neutralization. The acid can be an organic acid such as formic acid, lactic acid and acetic acid as well as inorganic acid such as phosphoric acid and sulfamic acid. Also, blends of acids including blends of organic and inorganic acids can be used. The extent of neutralization depends upon the particular reaction product and usually only sufficient acid is added to stabilize the resulting microgel dispersion. The expression "cationic polyepoxide-amine reaction product which contains primary and/or secondary amine groups" includes primary and secondary amine groups and the acid salts thereof.

The polyepoxide crosslinking agent usually dissolved in water-immiscible co-solvent such as methyl isobutyl ketone is then slowly stirred into the cationic polyepoxide-amine dispersion. This step is usually accomplished at ambient temperature and additional water may optionally be added. Typically, the solids content of the mixture will be about 10 to 40 percent by weight. Although the mixture may be reactive at room temperature, the dispersion is usually heated with continued stirring such that the final degree of crosslinking will be accomplished in a reasonable period of time. Typically, the dispersion is heated to about 40° to 90° C. for about 1 to 6 hours. During the heating step, the resultant dispersion begins to thicken and typically over this temperature range and time, the crosslinking action will be essentially complete.

A test to determine the degree of crosslinking in the dispersion is to recover the crosslinked microparticle from the dispersion such as by removing the aqueous diluent by evaporation. The dried material is placed in a Soxhlet extractor and extracted for 12 hours in boiling solvent such as tetrahydrofuran. At least 25, preferably at least 50 percent by weight of the microparticle is not extracted.

The resin solids content of the cationic microgel dispersion is typically from about 5 to 40 percent by weight. The dispersions at this solids content have good storage stability. The particle size of the cationic microgel dispersion is typically from about 500 to 2,000 Angstroms with the particle size being determined by light scattering techniques.

The cationic microgels can be recovered from the aqueous dispersions as dried products by solvent evaporation, spray drying or the like. The dried product can then be redispersed or used as such, for example, as a flow control additive in powder coatings.

The polyepoxide used in forming the polyepoxide-amine reaction product is a polymeric material containing two or more epoxy groups per molecule and preferably two per molecule. The polyepoxides are of relatively high molecular weight having molecular weights of at least 200 and preferably in the range of 200 to 2000 and more preferably about 340 to 2000. The polyepoxides can be essentially any of the well known types such as polyglycidyl ethers of cyclic polyols such as polyhydric phenols, for example, bisphenols such as bisphenol A. These polyepoxides can be produced by etherification of a polyhydric phenol with epihalohydrin or dihalohydrin such as epichlorohydrin or dichlorohydrin in the presence of alkali. Examples of other cyclic polyols would be alicyclic polyols, particularly cycloaliphatic polyols such as 1,2-cyclohexanediol and 1,2-bis(hydroxymethyl) cyclohexane.

Another quite useful class of polyepoxides are produced from novolak resins or similar polyhydroxyphenol resins.

The polyepoxides described above can be further reacted with active hydrogen-containing compounds, i.e., compounds containing groups which are reactive with epoxides to chain extend and increase the molecular weight of the polyepoxides. The chain extender in effect acts as a chemical bridge between the lower molecular weight polymer chains bringing them together to produce an advanced or higher molecular weight product. Typical chain extenders for the polyepoxides are polyhydroxyl group-containing materials selected from alcoholic hydroxyl group-containing materials and phenolic hydroxyl group-containing materials. Examples of phenolic hydroxyl group-containing materials are bisphenol A and resorcinol. Examples of alcoholic hydroxyl group-containing materials are simple polyols such as neopentyl glycol as described in Canadian Patent 1,179,443; polyester polyols such as described in U.S. Pat. No. 4,148,772 and polyether polyols such as described in U.S. Pat. No. 4,468,307 which is preferred.

Besides the polyglycidyl ethers mentioned above, other epoxy-containing polymers which may be employed are acrylic polymers which contain epoxy groups. These polymers are formed by polymerizing an unsaturated epoxy-containing monomer such as glycidyl acrylate or methacrylate with one or more other polymerizable ethylenically unsaturated monomers. Examples of other ethylenically unsaturated polymerizable epoxy group-containing monomers are allyl glycidyl ether and vinyl glycidyl phthalate.

Examples of other ethylenically unsaturated polymerizable monomers are those having at least one

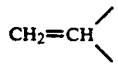

group. Examples of such monomers include vinyl acetate, methyl acrylate, ethyl acrylate, methyl methacrylate, acrylonitrile, styrene, 1,3-butadiene, vinyl chloride, hydroxyethyl acrylate or methacrylate and hydroxypropyl acrylate or methacrylate.

The epoxy-containing acrylic polymers are prepared by techniques well known in the art. The acrylic monomers are usually polymerized either in bulk or in solvent using a free radical producing catalyst such as peroxide-type catalyst or an azo compound. Examples of suitable catalysts are tertiary-butyl peroxide and 2,2'-azobisisobutyronitrile. Usually to control molecular weight, a chain transfer agent such as tertiary-dodecyl mercaptan is also employed.

The amine which is reacted with the polyepoxide is preferably a ketimine of a polyamine. This is described in U.S. Pat. No. 4,104,147 at column 6, line 23, to column 7, line 23, the portions of which are hereby incorporated by reference. The ketimine groups will decompose upon dispersing the polyepoxide-amine reaction product in water releasing primary amine groups.

The ketimine derivative can be virtually any polyamine capable of reacting with an epoxy group having at least one secondary amine group and containing primary amine groups. The preferred polyamines are the alkylene polyamines and substituted alkylene polyamines. Typical amines are diethylenetriamine, triethylenetetraamine, etc., and the corresponding propylene, butylene and higher alkylene amines. Other amines which may be used include primary-secondary amines such as N-amino-ethylpiperizine.

The primary amine group of the polyamine compounds are converted to ketimine groups by reaction with ketones. Preferred examples of ketones include acetone, methyl ethyl ketone, diethylketone, methyl propyl ketone, methyl isopropyl ketone, methyl isobutyl ketone, cyclohexanone and the like. Especially preferred ketones are methyl ethyl ketone and methyl isobutyl ketone.

In addition to the polyamine derivative, the amine which is reacted with the polyepoxide can be a mixture of the polyamine derivative and a secondary monoamine. Examples of secondary monoamines include di lower alkyl amines and hydroxyl-containing mono and di lower alkyl amines in which the alkyl and hydroxyalkyl groups contain from 1 to 18, preferably 1 to 6 carbon atoms. Examples include dimethylamine, diethylamine, N-methylethanolamine, diethanolamine and dicocoamine.

The reaction of the amine with the polyepoxide takes place upon mixing the amine with the polyepoxide. Reaction can be conducted neat or optionally in the presence of a suitable solvent. Reaction may be exothermic and cooling may be desired. However, heating to a moderate temperature, that is, within the range of 50° to 150° C., may be used to hasten the reaction.

Primary and/or secondary amine groups can be incorporated into the polyepoxide-amine reaction product by reacting the polyepoxide with polyamines such as ethylenediamine, diethylenetriamine, triethylenetetraamine and polyoxyalkylenepolyamines such as polyoxypropylenediamine having a molecular weight of 2,000, and with mono primary amines such as alkylamines and alkanolamines containing from 1 to 6 carbon atoms in the alkyl group. Specific examples of such amines include ethylamine, propylamine and monoethanolamine. When using polyamines or mono primary amines, special precautions should be taken to minimize the danger of gelation, for example, excess amine can be used and the excess vacuum stripped at the completion of the reaction. Also, the polyepoxide can be added to the amine to insure that excess amine will be present.

The polyepoxide-amine reaction product described above containing primary and/or secondary amine groups typically has amine group equivalent weights (based on primary and secondary amine with primary amine being considered monofunctional) of from 300 to 4,000, preferably 500 to 2,500 grams per equivalent of amine.

The polyepoxide crosslinker can be any of the polyepoxides described above. Typically, however, the polyepoxide crosslinker will be a polyglycidyl ether of a polyhydric phenol such as bisphenol A or an epoxy novolac resin having an epoxy equivalent weight of at least 200 and preferably in the range of 200 to 2000.

To effectuate the crosslinking reaction, the equivalent ratio of epoxy to amine (based on primary and secondary amine, primary amine being considered monofunctional) is typically from about 1:0.5 to 2.0, preferably 1:0.8 to 1.2.

The cationic microgel dispersion prepared as described above can be used as is, i.e., in a dispersed form, and simply combined with an aqueous dispersion of an ungelled cationic electrodepositable resin to form an aqueous resinous dispersion suitable for use in cationic electrodeposition. Alternately, the cationic microgel can be recovered from the dispersion such as by azeotropic distillation, spray drying or the like and then combined with the ungelled cationic electrodepositable resin.

The cationic microgel is usually present in the aqueous electrodepositable resinous dispersion in amounts of 0.1 to 20 percent by weight, preferably 2 to 10 percent by weight, based on weight of resin solids of the aqueous resinous dispersion. Amounts greater than 10 percent by weight are not preferred because rougher than desired electrodeposited films result, whereas amounts less than 0.1 percent by weight do not provide a significant improvement in edge coverage.

Examples of ungelled cationic resins include amine salt group-containing resins which are the acid-solubilized reaction products of polyepoxides with primary or secondary amines such as described in U.S. Pat. No. 4,031,050 to Jerabek. Usually, these amine salt group-containing resins are used in combination with a blocked polyisocyanate curing agent. The isocyanate can be fully blocked as described in the aforementioned U.S. Pat. No. 4,031,050 or the isocyanate can be partially blocked and reacted with the polyepoxide-amine resin backbone. Such resinous systems are described in U.S. Pat. No. 3,947,358 to Jerabek et al. Also, one-component compositions are described in U.S. Pat. No. 4,134,866 and DE-OS No. 2,752,255. Besides the polyepoxide-amine reaction products, the dispersed cationic microgel of the invention can also be used with ungelled cationic acrylic resins such as described in U.S. Pat. Nos. 3,455,806 and 3,928,157.

Besides amine salt group-containing resins, quaternary ammonium salt group-containing resins can also be used as the ungelled cationic resin. Examples of these resins are those which are formed from reacting an organic polyepoxide with a tertiary amine acid salt. Such resins are described in U.S. Pat. Nos. 3,962,165; 3,975,346 and 4,001,156 to Bosso and Wismer. Examples of other cationic resins are ternary sulfonium salt group-containing resins such as those described in U.S. Pat. No. 4,038,232 to Bosso and Wismer. Also, cationic electrodepositable resins which cure via a transesterification mechanism such as described in European Patent Application No. 12463 can also be employed.

The cationic electrodepositable resins are ungelled, that is, they are substantially free of crosslinking. Typically, when the resin is recovered from dispersion, dried and extracted with boiling solvent as described above, less than 10 percent of the resin is not extracted.

The ungelled cationic resin is typically present in the aqueous electrodepositable resinous dispersion in amounts of 70 to 90 percent by weight, preferably 75 to 85 percent by weight based on weight of resin solids of the aqueous resinous dispersion.

The mixture of the ungelled cationic resin and the dispersed cationic microgel is in the form of a dispersion, preferably an aqueous dispersion. Dispersions in polar organic solvents such as methanol can be obtained. The term "dispersion" is believed to be, as described above, a two-phase, transparent, translucent or opaque resinous system in which the resinous phase is the dispersed phase and the dispersing medium such as water is the continuous phase. The average particle size diameter of the resinous phase is generally less than 10, preferably less than 5 microns. The concentration of the resinous phase in the dispersing medium is usually about 0.5 and usually from 0.5 to 50 percent by weight based on total weight of the dispersion.

In the case of aqueous dispersion, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxypentanone, ethylene and propylene glycol and the monoethyl, monobutyl and monohexyl ethers of ethylene glycol. The amount of coalescing solvent is not unduly critical and is preferably between about 0.01 and 40 percent, preferably about 0.05 to about 25 percent by weight based on total weight of the aqueous medium.

Optionally, a pigment composition and, if desired, various additives such as surfactants, wetting agents and flow control agents may be included in the dispersion. Pigment compositions may be of the conventional types comprising, for example, iron oxides, lead oxides, strontium chromate, carbon black, coal dust, titanium dioxide, talc, barium sulfate as well as color pigments such as cadmium yellow, cadmium red and the like. The pigment content of the dispersion is usually expressed as the pigment to resin ratio. In the practice of the present invention, the pigment to resin ratio is usually within the range of 0.02 to 1:1.

Examples of surfactants and wetting agents include alkyl imidazolines such as those available from Geigy Industrial Chemicals as GEIGY AMINE C, acetylenic alcohols available from Air Products and Chemicals as SURFYNOL. Examples of flow control agents are those described in U.S. Pat. No. 4,432,850. These optional ingredients when present constitute up to 30, usually 0.1 to 5 percent by weight based on weight of resin solids.

When the aqueous dispersions as described above are used in the electrodeposition process, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which the electrodeposition is carried out are well known in the art. Electrodeposition is usually carried out at a constant voltage. The applied voltage may be varied and can be, for example, as low as one volt or as high as several thousand volts but typically between 50 and 500 volts. The current density is usually between 1 ampere and 15 amperes per square foot (10.8–161.5 amperes per square meter) and tends to decrease during electrodeposition indicating the formation of a continuous self-insulating film.

The coating compositions of the present invention can be applied to a variety of electroconductive substrates, usually metals such as steel, aluminum, copper, magnesium and the like but also including metallized plastic and conductive carbon-coated materials. For other conventional coating applications, the compositions can be applied to non-metallic substrates such as glass, wood and plastic.

After deposition, the coating is cured at elevated temperatures such as by baking in ovens. The curing temperature will typically be conducted over the range of from 120° to 250° C., preferably from 120° to 190° C. for anywhere from 10 to 60 minutes. The thickness of the resultant film will typically vary from about 20 to 50 microns.

The aqueous resinous dispersions of the present invention besides being applied by electrodeposition can also be applied by conventional coating applications such as flow, dip, spray and roll coating applications.

Illustrating the invention are the following examples which, however, are not to be considered as limiting the invention to their details. All parts and percentages in the examples as well as throughout the specification are by weight unless otherwise indicated.

EXAMPLES

The following examples show the preparation of various ingredients used in the formulation of cationic electrodeposition paints and show the formulation of the cationic electrodeposition paints themselves. Specifically, cationic electrodeposition paints containing cationic microgels were prepared and compared to a similar cationic electrodeposition paint containing no cationic microgel for edge coverage and surface profile.

EXAMPLES A-G

These examples show the preparation of the microgels used in the formulation of high edge coverage paints.

EXAMPLE A

This example shows the preparation of an ungelled cationic soap based on aromatic epoxy resin used in the synthesis of two microgel examples shown below. The cationic soap was prepared from the following mixture of ingredients:

| Ingredients | Parts by Weight |
| --- | --- |
| EPON 828[1] | 1023.0 |
| Bisphenol A-ethylene oxide adduct (1/6 molar ratio) | 365.0 |
| Bisphenol A | 297.0 |
| Methyl isobutyl ketone | 88.7 |
| Benzyldimethylamine | 1.4 |
| Benzyldimethylamine | 4.2 |
| Diketimine[2] | 179.4 |
| N-methylethanolamine | 85.2 |
| Lactic acid (88% aqueous) | 227.7 |
| Deionized water | 1293.0 |
| Deionized water | 3097.6 |

[1]Diglycidyl ether of bisphenol A having an epoxy equivalent weight of 188, commercially available from the Shell Chemical Co.
[2]Diketimine derived from diethylenetriamine and methyl isobutyl ketone (73 percent solids in methyl isobutyl ketone).

The EPON 828, bisphenol A-ethylene oxide adduct, bisphenol A and methyl isobutyl ketone were charged into a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for one-half hour, cooled further to 145° C. and the second portion of benzyldimethylamine added. The reaction was held at 145° C. until a reduced Gardner-Holdt viscosity (50 percent resin solids in 2-methoxypropanol) of O-P was obtained. At this point, the reaction mixture was cooled to 125° C. and the diketimine and N-methylethanolamine were added in succession. The mixture was allowed to exotherm to 140° C. and then cooled to 125° C. and held there for one hour. At the end of an hour hold, the resin was dispersed in an aqueous medium consisting of the lactic aid and the first portion of deionized water. The dispersion was then further thinned with the second portion of deionized water to give a cationic epoxy soap having a solids content of 31 percent and a particle size of less than 300 Angstroms.

EXAMPLE B

This example shows the synthesis of a cationic microgel from the cationic epoxy soap described above in Example A. The cationic microgel was prepared from the following ingredients:

| Ingredients | Parts by Weight |
| --- | --- |
| Cationic epoxy soap from Example A | 2258.1 |
| Deionized water | 1510.8 |
| EPON 828 | 71.7 |
| Methyl isobutyl ketone | 17.9 |
| Deionized water | 598.7 |

The cationic epoxy soap and the first portion of deionized water were charged to a reaction vessel and stirred under nitrogen for at least 5 minutes to accomplish mixing. The EPON 828 as a solution in the methyl isobutyl ketone was then added to the vessel with continued stirring and the resulting mixture heated to 90° C. and held there for 3 hours. At the end of the hold, the reaction mixture was diluted with the second portion of deionized water and vacuum stripped while cooling to 60° C. Stripping was continued at this temperature until a total of 170 parts of distillate was collected. The resulting mixture was then cooled to room temperature to give a cationic microgel having a solids content of 18 percent and a particle size of 750 Angstroms.

EXAMPLE C

This example shows the synthesis of another cationic microgel from the cationic epoxy soap described above in Example A. The cationic microgel was prepared from the following ingredients:

| Ingredients | Parts by Weight |
| --- | --- |
| Cationic epoxy soap from Example A | 2258.1 |
| Deionized water | 1499.1 |
| DEN-438[1] | 68.6 |
| Methyl isobutyl ketone | 17.2 |
| Deionized water | 597.0 |

[1]Epoxy novlac resin available from the Dow Chemical Co.

The cationic epoxy soap and the first portion of deionized water were charged to a reaction vessel and stirred under nitrogen for at least 5 minutes to accomplish mixing. The DEN-438 as a solution in the methyl isobutyl ketone was then added to the vessel with continued stirring and the resulting mixture heated to 90° C. and held there for 3 hours. At the end of the hold, the reaction mixture was diluted with the second portion of deionized water and vacuum stripped while cooling to 60° C. Stripping was continued at this temperature until a total of 170 parts of distillate was collected. The resulting mixture was then cooled to room temperature to give a cationic microgel having a solids content of 18 percent and a particle size of 1440 Angstroms.

EXAMPLE D

This example shows the preparation of an ungelled cationic soap, based on a JEFFAMINE D-2000 and EPON 1001 adduct, used in the synthesis of the microgel shown below. The cationic soap was prepared from the following mixture of ingredients:

| Ingredients | Parts by Weight |
|---|---|
| JEFFAMINE D-2000 | 3750.9 |
| EPON 1001[1] in toluene at 75% solids | 2052.3 |
| Toluene | 648.2 |
| Lactic acid (88% aqueous) | 232.6 |
| Deionized water | 2929.6 |
| Deionized water | 9275.0 |

[1]Polyglycidyl ether of bisphenol A available from the Shell Chemical Co.

A polyoxypropylenediamine having a molecular weight of 2000 and commercially available from Texaco Chemical Company as JEFFAMINE D-2000 was charged to a reaction vessel under a nitrogen atmosphere and heated to 90° C. The EPON 1001 solution and the toluene were added over a half-hour period and the resulting mixture was heated to 130° C. The reaction mixture was held at 125° to 130° C. for 3 hours whereupon a Gardner-Holdt viscosity of Y- was reached. The mixture was then reverse thinned into a mixture of the lactic acid and the first portion of deionized water to give a high solids dispersion. After mixing for one-half hour, the high solids dispersion was reduced with the second portion of deionized water to give a dispersion with a solids content of 26.4 percent.

EXAMPLE E

This example shows the synthesis of a cationic microgel from the cationic epoxy-JEFFAMINE soap described above in Example D. The cationic microgel was prepared from the following ingredients:

| Ingredients | Parts by Weight |
|---|---|
| Cationic epoxy-JEFFAMINE soap from Example D | 3049.2 |
| EPON 828 in toluene at 90% solids | 20.0 |
| Deionized water | 450.0 |

The cationic epoxy-JEFFAMINE soap was charged to a reaction vessel and stirred while the EPON 828 solution was added. The resulting mixture was passed once at 5000 psi through a Microfluidics microfluidizer model 110T with a large dispersion chamber and then stirred overnight at room temperature. After stirring at room temperature for 16 hours, the reaction mixture was diluted with the deionized water, heated to 60° C. and vacuum stripped until 450 parts by weight of distillate had been collected. The resulting cationic microgel had a solids content of 31.7 percent and a particle size of 233 Angstroms.

EXAMPLE F

This example shows the preparation of an ungelled cationic soap, based on a styrenated acrylic resin, used in the synthesis of the microgel shown below. The cationic soap was prepared from the following mixture of ingredients:

| Ingredients | Parts by Weight |
|---|---|
| Methyl isobutyl ketone | 150.0 |
| Butyl acrylate | 352.0 |
| Styrene | 352.0 |
| Hydroxypropyl methacrylate | 151.7 |
| Glycidyl methacrylate | 144.3 |
| Methyl isobutyl ketone | 162.3 |
| VAZO-67[1] | 30.0 |
| Tertiary dodecyl mercaptan | 35.0 |
| Methyl isobutyl ketone | 30.0 |
| VAZO-67 | 9.0 |
| Diketimine[2] | 113.3 |
| N-methylethanolamine | 53.8 |
| Lactic acid (88% aqueous) | 134.0 |
| Deionized water | 2358.4 |
| Deionized water | 2016.5 |

[1]2,2'-azobis-(2-methylbutyronitrile) available from Du Pont.
[2]Diketimine derived from diethylenetriamine and methyl isobutyl ketone (73 percent solids in methyl isobutyl ketone).

The first portion of the methyl isobutyl ketone was charged to a reaction vessel and heated to 110° C. under nitrogen. The butyl acrylate, styrene, hydroxypropyl methacrylate, glycidyl methacrylate, second portion of methyl isobutyl ketone, first portion of VAZO-67 and tertiary dodecyl mercaptan were charged to an erlenmeyer flask and mixed well. The monomer mixture was added dropwise to the hot methyl isobutyl ketone in the reaction vessel over a two and one-half hour period while maintaining a 107° to 113° C. reaction temperature. Upon completion of the addition of the monomers, the mixture in the reaction vessel was held for an hour at 107° to 113° C. The second portion of VAZO-67 was then added dropwise over 15 minutes as a solution in the third portion of methyl isobutyl ketone. Upon completion of the scavenger charge, the reaction mixture was held at 107° to 113° C. for 30 minutes, and then the temperature was raised gradually to 150° C. over 30 minutes while 223 parts by weight of distillate was collected. The finished acrylic was cooled to 125° C. and then aminated by the addition of the diketimine followed immediately by the N-methylethanolamine. After the exotherm had subsided, the reaction mixture was rewarmed to 125° C. and held there for 2 hours to complete the amination.

At the end of the two hour hold, the aminated acrylic resin was dispersed in an aqueous medium consisting of the lactic acid and the first portion of the deionized water. The dispersion was then further thinned with the second portion of deionized water to give a cationic acrylic soap having a solids content of 22 percent and a particle size of less than 300 Angstroms.

EXAMPLE G

This example shows the synthesis of a cationic microgel from the cationic acrylic soap described above in Example F. The cationic microgel was prepared from the following ingredients:

| Ingredients | Parts by Weight |
|---|---|
| Cationic epoxy soap from Example F | 3177.5 |
| Deionized water | 573.0 |
| EPON 828 | 66.8 |
| Methyl isobutyl ketone | 16.7 |
| Deionized water | 686.0 |

The cationic epoxy soap and the first portion of deionized water were charged to a reaction vessel and stirred under nitrogen for at least 5 minutes to accomplish mixing. The EPON 828 as a solution in the methyl isobutyl ketone was then added to the vessel with continued stirring and the resulting mixture heated to 90° C. and held there for 3 hours. At the end of the hold, the reaction mixture was diluted with the second portion of deionized water and vacuum stripped while cooling to 60° C. Stripping was continued at this temperature until a total of 260 parts of distillate was collected. The resulting mixture was then cooled to room temperature to give a cationic microgel having a solids content of 18 percent and a particle size of 1000 Angstroms.

EXAMPLE H

This example shows preparation of a polyepoxidepolyoxyalkylenediamine adduct for subsequent addition to a cationic electrodeposition bath to provide better appearance in the cured coating. In order to prepare the adduct, an intermediate polyepoxide was prepared from the following mixture of ingredients:

| Ingredients | Parts by Weight |
| --- | --- |
| EPON 828 | 1000.0 |
| Bisphenol A | 308.1 |
| Ethyltriphenyl phosphonium iodide | 1.3 |
| 2-Butoxyethanol | 413.5 |

The EPON 828 and bisphenol A were charged to a reaction vessel under a nitrogen blanket and heated to 110° C. The reaction mixture was held at 110° C. until all the bisphenol A had dissolved whereupon the ethyltriphenyl phosphonium iodide catalyst was added and the reaction mixture was heated to 160° C. to initiate reaction. The mixture was allowed to exotherm to 180° C. and then cooled to 160° C. where it was held for an hour to complete reaction. When the hold was over, the 2-butoxyethanol was added to give a solids content of 76 percent and an epoxy equivalent of 504 (based on solids).

The adduct was then prepared from the following mixture of ingredients:

| Ingredients | Parts by Weight |
| --- | --- |
| JEFFAMINE D-2000 | 2362.2 |
| Polyepoxide intermediate prepared as described above | 1141.6 |
| 2-Butoxyethanol | 296.1 |
| 88% Aqueous lactic acid solution | 96.6 |
| Deionized water | 5279.1 |

A polyoxypropylenediamine having a molecular weight of 2000 and commercially available from Texaco Chemical Company as JEFFAMINE D-2000 was reacted with the polyepoxide intermediate as follows: The JEFFAMINE D-2000 was charged to a reaction vessel under a nitrogen atmosphere and heated to 90° C. The polyepoxide intermediate and the 2-butoxyethanol were added over a one-half hour period. At the completion of the addition, the reaction mixture was heated to 130° C. and held there for 3 hours. The resin was then dispersed by pouring into a mixture of the 88 percent aqueous lactic acid solution and deionized water. The resulting reaction product had a solids content of 35.2 percent.

EXAMPLE I

This example shows the preparation of the cationic electrodeposition binder used in the formulation of the cationic electrodeposition baths described below. The resin was prepared from the following mixture of ingredients:

| Ingredients | Parts by Weight |
| --- | --- |
| EPON 828 | 1023.0 |
| Bisphenol A-ethylene oxide adduct (1/6 molar ratio) | 365.0 |
| Bisphenol A | 297.0 |
| Methyl isobutyl ketone | 88.7 |
| Benzyldimethylamine | 1.4 |
| Benzyldimethylamine | 4.2 |
| Crosslinker[1] | 1783.9 |
| Diketimine | 113.7 |
| N-methylethanolamine | 98.6 |
| Sulfamic acid | 93.4 |
| Deionized water | 2252.7 |
| Deionized water | 1360.4 |
| Deionized water | 2137.7 |

[1] A capped polyisocyanate crosslinker was prepared from the following mixture of ingredients:

| | |
| --- | --- |
| Polyisocyanate[a] | 4095.0 |
| Methyl isobutyl ketone | 2199.6 |
| Dubutyltin dilaurate | 6.2 |
| 2-(2-Butoxyethoxy)ethanol | 3353.0 |
| Trimethylol propane | 356.1 |
| 2-(2-Butoxyethoxy)ethanol | 464.2 |

[a] Polymeric MDI available from Mobay Chemical Company as MODUR MRS-4.

The polyisocyanate, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60° to 65° C. Upon completion of the addition the reaction mixture was held at 65° C. for 90 minutes. The trimethylol propane was then added and the mixture heated to 110° C. and held there for 3 hours whereupon the final portion of the 2-(2-butoxyethoxy)ethanol was added. The 110° C. hold was continued until infrared analysis indicated no unreacted NCO remained.

The EPON 828, bisphenol A-ethylene oxide adduct, bisphenol A and methyl isobutyl ketone were charged into a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for one-half hour, cooled further to 145° C. and the second portion of benzyldimethylamine added. The reaction was held at 145° C. until a reduced Gardner-Holdt viscosity (50 percent resin solids in 2-methoxypropanol) of P-Q was obtained. At this point, the crosslinker, the diketimine and N-methylethanolamine were added in succession. The mixture was allowed to exotherm and then a temperature of 125° C. was established. After one hour at 125° C., the resin was dispersed in aqueous medium by adding it to a mixture of the sulfamic acid and the first portion of deionized water. The dispersion was further thinned in stages with the second and third portions of deionized water and vacuum stripped to remove organic solvent to give a dispersion having a solids content of 38.9 percent and a particle size of 825 Angstroms.

EXAMPLES 1 to 9

These examples show the preparation and the evaluation of cationic electrodeposition paints using the cationic microgels of Examples A to G as well as certain materials described in the preceding examples.

EXAMPLE 1 (CONTROL)

A control cationic electrodeposition bath was formulated without microgel from a mixture of 144.9 grams of the JEFFAMINE adduct described in Example H, 34.0 grams of the formal of 2-(2-n-butoxyethoxy)ethanol and 100.0 grams of deionized water. To this mixture was added 1,238.0 grams of the cationic binder of Example I, 474.7 grams of a pigment paste which contributed 156.8 grams of titanium dioxide, 18.9 grams of a silica extender, 13.8 grams of lead silicate, 10.2 grams of dibutyltin oxide and 3.9 grams of carbon black and enough deionized water to give a bath solids of 21 percent. The resulting cationic electrodeposition paint had a solids content of 21 percent and a pigment to binder ratio of 0.32/1.0.

After 20 percent ultrafiltration the bath was evaluated as follows. Smooth cold rolled steel 27 microinch profile panels prepared by ACT with a CHEMFIL 168/C20 pretreatment were electrodeposited in the bath at a voltage between 205 and 250 volts for 2 minutes at 83° F. in order to get a one mil film thickness for the cured film. The panels were cured at 360° F. for 20 minutes and the profile of the coating measured. In order to measure the edge coverage/corrosion resistance, utility knife blades were given the same pretreatment as the cold rolled steel panels, electrocoated similarly and the coating cured as above. The knife blades (about 4 inch lengths) were subjected to salt spray for 3, 7 and 11 days and the average number of rust spots per blade recorded. The results are reported in Table I below.

EXAMPLE 2

A cationic electrodeposition bath similar to that of Example 1 was prepared except that 28.3 grams of the cationic binder solids of Example I were replaced with 28.3 grams of solids from the microgel of Example B and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration (and reconstituted with deionized water) the bath was evaluated as in Example 1 for profile and edge coverage/corrosion. The results are reported in Table I below.

EXAMPLE 3

A cationic electrodeposition bath similar to that of Example 1 was prepared except that 39.7 grams of the cationic binder solids of Example I were replaced with 39.7 grams of solids from the microgel of Example B and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion. The results are reported in Table I below.

EXAMPLE 4

A cationic electrodeposition bath similar to that of Example 1 was prepared except that 28.3 grams of the cationic binder solids of Example I were replaced with 28.3 grams of solids from the microgel of Example C and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion. The results are reported in Table I below.

EXAMPLE 5

A cationic electrodeposition bath similar to that of Example 1 was prepared except that 39.7 grams of the cationic binder solids of Example I were replaced with 39.7 grams of solids from the microgel of Example C and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion. The results are reported in Table I below.

EXAMPLE 6

A cationic electrodeposition bath similar to that of Example 1 was prepared except that 28.3 grams of the cationic binder solids of Example I were replaced with 28.3 grams of solids from the microgel of Example E and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion. The results are reported in Table I below.

EXAMPLE 7

A cationic electrodeposition bath similar to that of Example 1 was prepared except that 39.7 grams of the cationic binder solids of Example I were replaced with 39.7 grams of solids from the microgel of Example E and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion. The results are reported in Table I below.

EXAMPLE 8

A cationic electrodeposition bath similar to that of Example 1 was prepared except that 28.3 grams of the cationic binder solids of Example I were replaced with 28.3 grams of solids from the microgel of Example G and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion except that edge corrosion was evaluated at 7 days salt spray only. The results are reported in Table I below.

EXAMPLE 9

A cationic electrodeposition bath similar to that of Example 1 was prepared except that 39.7 grams of the cationic binder solids of Example I were replaced with 39.7 grams of solids from the microgel of Example G and the quantity of deionized water used was adjusted to give a bath solids of 21 percent. The resulting cationic electrodeposition paint had a solids content of 21 percent and a pigment to binder ratio of 0.32/1.0.

After 20 percent ultrafiltration the bath was evaluated as in Example 1 for profile and edge coverage/corrosion except that edge corrosion was evaluated at 7 days salt spray only. The results are reported in Table I below.

TABLE I

Film Profile and Edge Corrosion of Examples 1 to 9

| Example Number | Microgel Example (Type) | Percent Microgel on Resin Solids | Surface Profile in Microinches | Rust Spots per Blade | | |
|---|---|---|---|---|---|---|
| | | | | at 3 days | at 7 days | at 11 days |
| 1 (control) | no microgel | 0.0% | 7 | 59 | 100 | 126 |
| 2 | B (Bisphenol A-Epoxy) | 4.5% | 21 | 0 | 0 | 0 |
| 3 | B (Bisphenol A-Epoxy) | 6.2% | 26 | 0 | 0 | 0 |
| 4 | C (Epoxy Novolac) | 4.5% | 26 | 0 | 0 | 0 |
| 5 | C (Epoxy Novolac) | 6.2% | 32 | 0 | 0 | 0 |
| 6 | E (JEFFAMINE soap) | 4.5% | 9 | 54 | 60 | 80 |
| 7 | E (JEFFAMINE soap) | 6.2% | 11 | 53 | 50 | 100 |
| 8 | G (Acrylic soap) | 4.5% | 16 | — | 33 | — |
| 9 | G (Acrylic soap) | 6.2% | 20 | — | 1 | — |

Surface Profile determined with a SURTRONIC 3 profilometer.
Salt Spray as described in ASTM D-117-73, salt spray fog at 100° F. (38° C.).

We claim:

1. A cationic microgel dispersion which is prepared by a process comprising dispersing in aqueous medium a mixture of a cationic polyepoxide-amine reaction product which contains amine groups selected from the group consisting of primary amine groups, secondary amine groups, and mixtures thereof and a polyepoxide crosslinking agent and heating said mixture to a temperature sufficient to crosslink the mixture to form said cationic microgel dispersion.

2. The cationic microgel dispersion of claim 1 in which the cationic polyepoxide-amine reaction product is formed from reacting a polyepoxide with a polyamine derivative having at least one primary amine group which is blocked by a ketimine group and having a secondary amine group and at least partially neutralizing the reaction product with acid.

3. The cationic microgel dispersion of claim 2 in which the amine used in preparing the polyepoxide-amine reaction product is a mixture of the polyamine derivative and a primary or secondary monoamine.

4. The cationic microgel dispersion of claim 2 in which the polyamine derivative is the diketimine of diethylenetriamine and methylisobutyl ketone.

5. The cationic microgel dispersion of claim 2 in which the polyepoxide used in preparing the polyepoxide-amine reaction product is a polyglycidyl ether of a polyhydric material.

6. The cationic microgel dispersion of claim 5 in which the polyepoxide is chain extended with a polyether polyol.

7. The cationic microgel dispersion of claim 6 in which the polyether polyol is a cyclic polyol-ethylene oxide adduct.

8. The cationic microgel dispersion of claim 1 in which the polyepoxide crosslinking agent is a polyglycidyl ether of a polyhydric material.

9. The cationic microgel dispersion of claim 8 in which the polyhydric material is a phenolic material.

10. The cationic microgel dispersion of claim 1 which has a resin solids content of 5 to 40 percent by weight.

11. An improved aqueous resinous dispersion suitable for use in electrodeposition comprising:

(A) an ungelled cationic resin which is electrodepositable on a cathode and (B) a dispersed cationic microgel which is prepared by a process comprising dispersing in aqueous medium a reactive mixture of a cationic polyepoxide-amine reaction product and a polyepoxide crosslinking agent and heating said mixture to a temperature sufficient to crosslink the mixture to form said cationic microgel.

12. The aqueous resinous dispersion of claim 11 in which the cationic polyepoxide-amine reaction product is formed from reacting a polyepoxide with a polyamine derivative having at least one primary amine group which is blocked by a ketimine group and at least partially neutralizing the reaction product with acid.

13. The aqueous resinous dispersion of claim 12 in which the amine used in preparing the polyepoxide-amine reaction product is a mixture of the polyamine derivative and a primary or secondary monoamine.

14. The aqueous resinous dispersion of claim 11 in which the polyepoxide crosslinking agent is a polyglycidyl ether of a polyhydric material.

15. The aqueous resinous dispersion of claim 14 in which the polyhydric material is a phenolic material.

16. The aqueous resinous dispersion of claim 11 in which the dispersed cationic microgel is present in amounts of 0.1 to 20 percent by weight, the percentage by weight being based on weight of resin solids of the aqueous resinous dispersion.

17. The aqueous resinous dispersion of claim 11 in which the resinous phase is present in amounts of from 5 to 50 percent by weight based on total weight of the aqueous dispersion.

18. In a method of coating a conductive substrate serving as a cathode in an electrical circuit comprising said cathode and an anode immersed in an aqueous resinous dispersion; said method comprising passing electric current between said cathode and said anode to cause a coating to deposit on said cathode, said aqueous resinous dispersion being that of claim 11.

19. In a method of coating a conductive substrate serving as a cathode in an electrical circuit comprising said cathode and an anode immersed in an aqueous resinous dispersion; said method comprising passing electric current between said cathode and said anode to cause a coating to deposit on said cathode, said aqueous resinous dispersion being that of claim 12.

20. In a method of coating a conductive substrate serving as a cathode in an electrical circuit comprising said cathode and an anode immersed in an aqueous resinous dispersion; said method comprising passing electric current between said cathode and said anode to cause a coating to deposit on said cathode, said aqueous resinous dispersion being that of claim 16.

21. A cationic microgel of claim 1 in which the microgel is recovered from the aqueous dispersion as a dried product.

22. A cationic microgel which is prepared by a process comprising mixing a cationic polyepoxide amine reaction product which contains amine groups selected from the group consisting of primary amine groups, secondary amine groups, and mixtures thereof and a polyepoxide crosslinking agent and heating the mixture to a temperature sufficient to crosslink the mixture to form said cationic microgel.

23. A cationic microgel dispersion which is prepared by a process comprising dispersing in aqueous medium a mixture of a cationic polyepoxideamine reaction product which contains amine groups selected from the group consisting of primary amine groups, secondary amine groups, and mixtures thereof and a polyepoxide crosslinking agent and heating said mixture to a temperature sufficient to crosslink the mixture to form said cationic microgel dispersion, wherein said cationic microgel dispersion has a particle size of less than about 2,000 Angstroms.

* * * * *